United States Patent Office 3,494,849
Patented Feb. 10, 1970

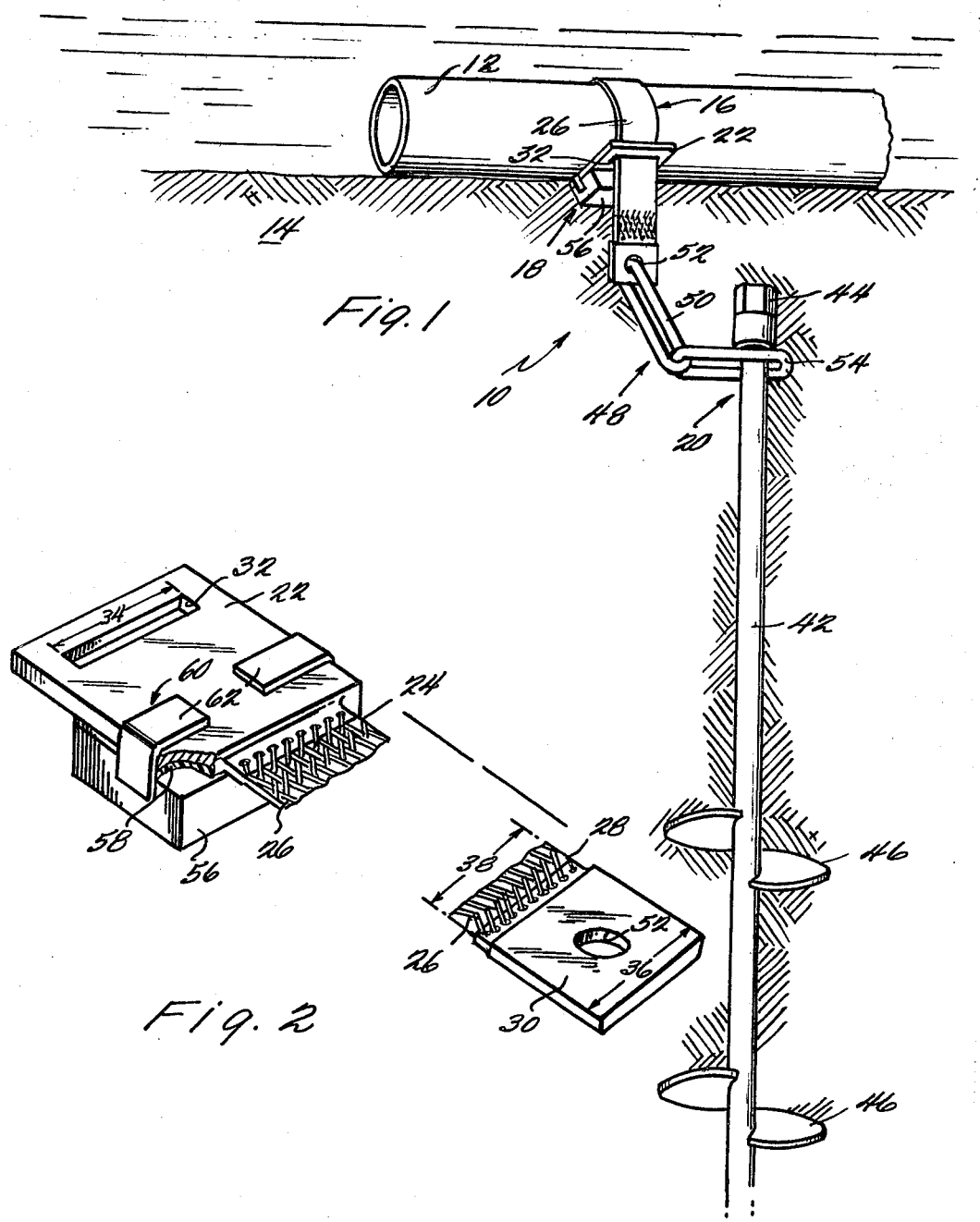

3,494,849
ANCHORING DEVICE
Owen B. Hess, Cambridge, Md., assignor to Cambridge Wire Cloth Company, Cambridge, Md., a corporation of Maryland
Filed Sept. 29, 1967, Ser. No. 671,817
Int. Cl. C23f *13/00;* F16l *3/08*
U.S. Cl. 204—197          16 Claims

ABSTRACT OF THE DISCLOSURE

An anchoring device comprising a strap with a female end fitting, a male end fitting, and a woven wire fabric therebetween; an anode appropriately secured to the strap preferably on the female fitting for retarding electrolytic corrosion; and an anchor secured to the strap preferably on the male end fitting, the device being adapted to anchor underwater pipeline.

BACKGROUND OF THE INVENTION

The invention relates to an underwater anchoring device utilizing a retaining strap which is adapted to encircle an underwater pipeline in a choke hitch. The free end of the strap is secured to an anchor, such as a screw-type anchor, adapted to be embedded in the underwater floor. The device will then permanently secure a pipeline to the bottom in such a manner that storms, anchors, dredges and the like will not be able to bend, break or otherwise damage the pipeline. Furthermore, this anchoring unit includes means for retarding electrolytic corrosion. In time the anchoring device will become corroded; however, the present device substantially lengthens the time before repairs are needed.

These anchoring devices are particularly useful in waters such as the Gulf of Mexico or the North Sea where off-shore drilling is taking place. In such areas of relatively shallow water turbulent wave action often tears up unanchored pipelines. One solution is, of course, to bury the pipelines, but anchoring devices are more suitable. Various attempts have been made to come up with a satisfactory device to secure pipelines to the ocean floor without having to bury them. These devices typically include an arcuate bracket or saddle secured to a segment of the underwater pipe and held in place by screw anchors, as illustrated in United States Patent Nos. 3,170,-663, 2,864,663, and 2,474,920. These devices require at least two divers during assembly and always require at least two screw anchors. Under wave action there is apt to be relative movement between the pipeline and the anchoring device which could damage the pipeline or its protective covering. Moreover, the shafts of the screw anchors extending above the ocean floor are subject to bending under heavy side thrusts.

The applicant also considered using a wire rope, but the rope was too stiff to manipulate underwater and had a tendency to cut through the protective coating on the pipe. Strap devices, using nylon or other synthetic fabrics, are somewhat difficult to work with due to their inherent buoyancy. Moreover, these devices do not offer means for retarding corrosion and thus have a shorter life than the present invention.

SUMMARY OF THE INVENTION

The provision of an anchoring device comprising a strap in which a male end fitting is inserted through a slot in the female end fitting enables the attachment to be a one-man operation. The flexibility and negative buoyancy of the strap enables the same to be easily lowered from a boat and to be easily attached around a pipeline. The wide, flat surface of the strap protects the coating of the pipe when the strap is choked down on the pipe. Moreover, the use of a choke hitch provides uniform loading which further protects the pipe's protective coating.

A screw anchor is provided to secure the strap to the ocean floor. The strap is flexibly connected to the screw anchor so that it can have slight movement in case of underwater disturbances.

The invention also includes means for retarding electrolytic corrosion. The best known galvanic or electrochemical corrosion occurs when two dissimilar metals are in contact in the presence of an electrolyte, such as salt water. A similar condition is obtained in an alloy which is not perfectly homogeneous or in a metal in which different parts have been subjected to different heat treatments or mechanical stresses. Under these conditions, different metals or certain parts of the same metal will have a higher potential than others, and in the presence of an electrolyte, a galvanic couple is formed. The metal or part of higher potential will tend to go into solution and corrode. Accordingly, the invention provides for the use of a "sacrificial" anode attached to the strap thereby creating a galvanic couple in which the anode corrodes.

BRIEF DESCRIPTION OF THE DRAWINGS

FIGURE 1 is a side elevation view showing the anchoring device secured to a pipeline; and FIGURE 2 is a detailed perspective view of the anchoring device with the screw anchor removed.

DESCRIPTION OF THE PREFERRED EMBODIMENT

FIGURE 1 shows the anchoring device 10 secured around a pipeline 12 and anchored to the ocean (sea, etc.) floor 14. The component parts of the anchoring device 10 are a strap 16, a means 18 for retarding electrolytic corrosion of the strap, and an anchoring means 20 adapted to be embedded in the underwater floor.

The strap 16 comprises a female end fitting 22, preferably made of steel, having one end 24 of a woven wire fabric 26, preferably made of steel, secured thereto. The other end 28 of the woven wire fabric 26 is secured to a male end fitting 30, likewise preferably made of steel. The female fitting 22 has a transverse slot 32 therethrough with a width 34 greater than the width 36 of the male fitting 30 and the width 38 of the woven wire fabric 26. These dimensional relationships enable the male fitting and the woven wire fabric to be inserted through the slot to form a choke hitch, illustrated in FIGURE 1, within which the pipeline can be received.

As illustrated, the anchoring means 20 preferably comprises a screw anchor 40 to which the strap is operatively connected. The screw anchor 40 comprises a shaft 42 with an enlarged head 44 and a plurality of helical fins 46, vertically disposed from each other, secured to the lower portion of the shaft 42. Preferably, connecting means 48 is provided for flexibly connecting the screw anchor 40 to the male fitting. The connecting means 48 is shown as comprising a shackle member 50 connected through a hole 52 in the male fitting 30. The shackle member 50 in turn is connected to a hitch 54. As will be appreciated, the shackle and hitch are simply illustrative of the many different types of connecting means which could be used and, as an example, could comprise a chain link or a series of U-bolts or the like. The head 44 on the shaft 42 prevents the hitch 54 from sliding off the top of the shaft. It may also be desirable to include a welding bead below the hitch to limit its downward movement.

The means 18 for retarding electrolytic corrosion is shown as comprising a metallic anode 56 attached to the female fitting 22 which becomes the cathode. This "sacrificial" anode preferably comprises zinc or magnesium, but certain other metals of higher electrical potential than the strap could be used to retard the electrolytic corrosion. It will also be appreciated that another means of retarding corrosion is the use of paint on the strap. However, the paint is easily chipped away and is not as effective as the use of a "sacrificial" anode. The anode, of course, could be attached to any other portion of the strap. Preferably, however, it is attached to the female fitting 22 rather than the male fitting 30 because of the tendency of the male fitting to become embedded in the mud floor. As an example, the female fitting of one strap was approximately 6" x 6⅝" x ½" and the zinc anode was 4" x 6" x 4" and weighed approximately 24 pounds.

It will be appreciated that the terms anode and cathode are used herein in a conventional sense where the anode has a higher electrical potential than the cathode.

A layer of non-conductive material 58, resistant to salt water, such as coal tar epoxy, could be provided between the anode 56 and the female fitting 22. This non-conductive material insulates the anode from the female fitting and prevents excessively high dissipation of the anode at the point of immediate contact with the female fitting in the presence of an electrolyte. It will also be appreciated that the coal tar epoxy, acting as an adhesive, aids in connecting the anode to the female fitting.

A connecting means 60 is provided for securing the anode to the strap and as illustrated this connecting means comprises a pair of metallic bars or straps 62 connected at one end to the anode and at the other end to the female fitting, although the straps could be replaced by bolts or the like. Of course, care has to be exercised in selecting the material of the straps so that they do not become the "sacrificial" anode. In one embodiment of the invention steel straps were cast in zinc anodes.

The anode is electrically connected to the female fitting. Preferably, a direct electrical connection is provided between the anode and the female fitting, such as by the metallic bars or any other type of connecting means. The circuit is then completed through the water acting as an electrolyte.

While a preferred form of the invention has been illustrated in the drawing and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and the scope of the claims appended hereto.

What is claimed is:

1. An anchoring device for underwater pipeline comprising:

a strap having a female fitting, a male fitting, and a woven wire fabric secured at one end to the female fitting and at the other end to the male fitting, the female fittng having a slot therethrough with a width greater than the width of the male fitting and the width of the woven wire fabric so as to enable the male fitting and wire fabric to be inserted therethrough to form a choke hitch within which a pipeline could be received;

anchoring means secured to the strap and adapted to be embedded in the underwater floor; and rearding means for retarding electrolytic corrosion of the strap positioned adjacent the strap.

2. The anchoring device defined in claim 1 wherein the anchoring means is attached to the male fitting.

3. The anchoring device defined in claim 1 wherein the anchoring means comprises a screw anchor.

4. The anchoring device defined in claim 3 wherein the screw anchor comprises a shaft and a plurality of vertically disposed helical fins secured to the shaft.

5. The anchoring device defined in claim 1 wherein the female and male fittings are made of steel.

6. The anchoring device defined in claim 1 wherein the means for retarding electrolytic corrosion comprises a metallic anode.

7. The anchoring device defined in claim 6 wherein the anode comprises zinc.

8. The anchoring device defined in claim 6 additionally comprisng a layer of non-conductive material between the anode and the strap and means securing and electrically connecting the anode and the strap.

9. The anchoring device defined in claim 8 wherein the layer of non-conductive material comprises a layer of coal tar epoxy.

10. The anchoring device defined in claim 6 wherein the metallic anode is positioned adjacent the female fitting.

11. The anchoring device defined in claim 10 additionally comprising a layer of non-conductive material between the anode and the female fitting and metallic straps of the same material as the female fitting connected at one end to the anode and at the other end to the female fitting.

12. The anchoring device defined in claim 1 additionally comprising means for flexibly securing the male fitting to the anchoring means.

13. The anchoring device defined in claim 12 wherein the male fitting has a hole therethrough and the flexible securing means comprises a shackle member inserted through the hole in the male fitting and operatively pivotally secured to the anchoring means.

14. The anchoring device defined in claim 13 wherein the anchoring means comprises a shaft adapted to be sunk in the ocean floor and a head secured to the top of the shaft of greater diameter than the shaft, and additionally comprising a hitch slidably positioned on the shaft below the head and having the shackle pivotally secured thereto.

15. An anchoring device for underwater pipeline comprising:

a strap having a metallic female fitting with a transverse slot therethrough, a woven wire fabric secured at one end to the female fitting, and a metallic male fitting secured to the other end of the woven wire fabric, the male fiting and woven wire fabric having transverse widths smaller than the width of the transverse slot so as to be able to be inserted therethrough to form a choke hitch within which a pipeline could be received;

a steel, screw anchor comprising a shaft and vertically disposed helical fins secured to the shaft;

means for securing the male fitting to the shaft of the screw anchor;

a metallic anode positioned adjacent and operatively connected to the female fitting for retarding electrolytic corrosion;

a layer of non-conductive material between the metallic anode and the female fitting; and means for electrically connecting the anode to the female fitting while simultaneously securing the anode to the female fitting.

16. The anchoring device defined in claim 15 wherein the securing means comprises a shackle slidably secured to the shaft of the anchor and a link member secured through the hole in the male fitting and pivotally secured to the shackle.

References Cited

UNITED STATES PATENTS

| | | | |
|---|---|---|---|
| 2,759,390 | 7/1956 | Edwards | 248—74 X |
| 2,851,414 | 9/1958 | Hubbard | 204—197 |
| 2,870,079 | 1/1959 | McCall | 204—197 |
| 3,001,924 | 9/1961 | Battis | 204—197 |
| 3,260,661 | 7/1966 | Kemp | 204—197 |
| 3,295,274 | 1/1967 | Fulton | 248—74 |

FOREIGN PATENTS

| | | |
|---|---|---|
| 372,257 | 6/1932 | Great Britain. |

CHANCELLOR E. HARRIS, Primary Examiner

U.S. Cl. X.R.

248—49; 307—95; 248—74; 174—6